United States Patent
Sheng

(10) Patent No.: US 7,458,708 B2
(45) Date of Patent: Dec. 2, 2008

(54) LIGHTING FIXTURE

(76) Inventor: Chen Keng Sheng, 2FL., No.20, Alley 7, Lane 191, Yu Shi Street, Yonghe City, Taipei County (TW)

(*) Notice: Subject to any disclaimer, the term of this patent is extended or adjusted under 35 U.S.C. 154(b) by 317 days.

(21) Appl. No.: 11/501,106

(22) Filed: Aug. 9, 2006

(65) Prior Publication Data
US 2008/0037280 A1 Feb. 14, 2008

(51) Int. Cl.
*F21V 7/04* (2006.01)
*F21V 5/00* (2006.01)
*F21S 4/00* (2006.01)
*G02B 6/36* (2006.01)

(52) U.S. Cl. ............... 362/551; 362/555; 362/558; 362/576; 362/581; 362/582; 385/88; 385/92; 385/100; 385/146

(58) Field of Classification Search .......... 362/551, 362/555, 558, 576, 581, 582, 602, 612, 628; 385/53, 88, 92, 100, 146, 901
See application file for complete search history.

(56) References Cited

U.S. PATENT DOCUMENTS

| 5,732,176 | A  | * | 3/1998 | Savage, Jr. ............ 385/92 |
| 6,883,949 | B2 | * | 4/2005 | Goto et al. ............ 362/551 |
| 7,217,022 | B2 | * | 5/2007 | Ruffin .................. 362/554 |
| 2004/0114386 | A1 | * | 6/2004 | Hung ................... 362/500 |

* cited by examiner

*Primary Examiner*—Sharon E Payne
*Assistant Examiner*—Sean P Gramling
(74) *Attorney, Agent, or Firm*—Rabin & Berdo, PC

(57) ABSTRACT

A lighting fixture is disclosed to include a light guide bar, a connector holding a LED at a first end of the light guide bar, and a first reflector and a second reflector respectively covered on a part of the periphery and a second end of the light guide bar to reflect light from the LED out of the light guide bar. The connector has a barrel at the first end thereof that accommodates one end of the light guide bar and the LED, an accommodation space at the second end that accommodates electronic components, and a detoured wire path that guides electric wires of the LED out of the connector and prevents disconnection of the electric wires from the LED. A second LED may be attached to the second end of the light guide bar to substitute for the second reflector.

8 Claims, 7 Drawing Sheets

LIGHTING FIXTURE

BACKGROUND OF THE INVENTION

1. Field of the Invention

The present invention relates to lights and more particularly, to a lighting fixture for illumination and decoration purposes.

2. Description of the Related Art

LEDs (Light Emitting Diodes) are intensively used for the purpose of illumination, signaling, or decoration, for the advantage of long working life and low power consumption. For example, the third stop lights of regular cars commonly use LEDs. The LEDs of a third stop light are arranged in a line. When the driver steps on the stop pedal, the LEDs of the third stoplight are driven to give off light. Further, LEDs are also intensively used for vehicle stoplights, directional lights, or internal decorative lights to substitute for conventional lamp bulbs. However, for illumination purpose, a single piece of LED does not provide sufficient intensity of light. Therefore, a LED lamp generally uses a number of LEDs. However, using a number of LEDs relatively increases the cost of the LED lamp. Moreover, light directly emitted from a LED is not soft.

SUMMARY OF THE INVENTION

The present invention has been accomplished under the circumstances in view. It is therefore the main object of the present invention to provide a lighting fixture, which eliminates the high cost problem of conventional LED lamps that commonly use a number of LEDs. It is another object of the present invention to provide a lighting fixture, which eliminates the non-soft problem of conventional LED lamps.

To achieve these and other objects and according to one aspect of the present invention, the lighting fixture comprises a single piece of LED or a limited number of LEDs, a light guide bar for guiding light from the LED(s), and reflectors on a part of the periphery of the light guide bar and one end of the light guide bar opposite to the LED(s) to reflect light from the LED(s) out of the light guide bar through the outer surface of the light guide bar, thereby providing a soft illumination.

According to another aspect of the present invention, two LEDs may be respectively provided at the two distal ends of the light guide bar to emit light into the light guide bar along the center longitudinal axis of the light guide bar.

According to still another aspect of the present invention, the light guide bar can be made having a rough outer surface.

According to still another aspect of the present invention, the light guide bar can be made having a cross section of circular or hexagonal shape, or any of a variety of other shapes.

According to still another aspect of the present invention, the reflector(s) and the light guide bar can be made in integrity, i.e., the light guide bar can be directly molded on the reflector(s).

According to still another aspect of the present invention, a cap can be capped on one end of the light guide bar opposite to the LED(s) to hold one reflector on the associating end of the light guide bar.

According to still another aspect of the present invention, a connector is used and affixed to one end of the light guide bar to hold the LED(s) in place. The connector comprises a body, and a barrel. The body has a first end, a second end, an accommodation space defined in the first end for accommodating electronic components, a notch at the periphery of the first end, and a detoured wire path for guiding electric wires from the LED(s) out of the notch to prevent disconnection of the electric wires from the LED(s) when the electric wires are stretched accidentally. The barrel extends from the bottom side of the second end of the body for accommodating one end of the light guide bar and the LED(s).

According to still another aspect of the present invention, the connector further comprises a cover hinged to one side of the body for closing the accommodation space. Further, a hook and a retaining eye member may be respectively provided at the cover and the body such that the hook and the retaining eye member are engaged together to hold the cover in place when the cover is closed on the body.

According to still another aspect of the present invention, the barrel of the connector has a transverse through hole through which a molten resin is fed into the inside of the barrel to affix one end of the light guide bar to the inside of the barrel.

According to still another aspect of the present invention, the cover and body of the connector have air vents for dissipation of heat from the LED(s).

As stated above, the invention uses a light guide bar to guide out light from LED(s), therefore the lighting fixture provides a soft illumination. Further, due to the effects of the light guide bar and the reflectors, one single piece of LED or a limited number of LEDs is sufficient to provide a satisfactory illumination, thereby saving the cost.

DETAILED DESCRIPTION OF THE PREFERRED EMBODIMENT

Figure 1:
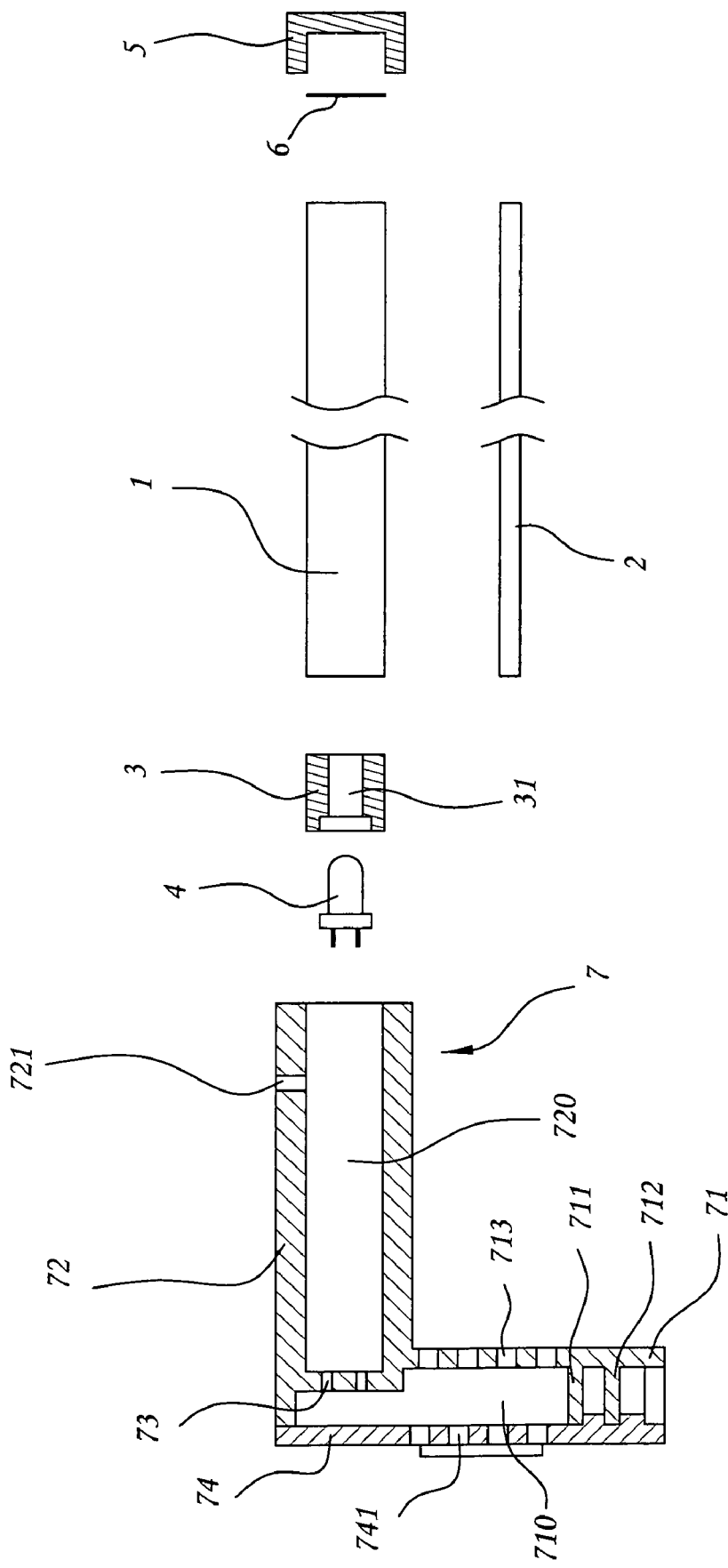
FIG. 1 is an exploded view in plain of a lighting fixture in accordance with one embodiment of the present invention.

Referring to FIG. 1, a lighting fixture in accordance with one preferred embodiment of the present invention is shown comprised of a light guide bar 1, a first reflector 2, a socket 3, a light emitting device 4, a cap 5, a second reflector 6, and a connector 7.

Figure 5:
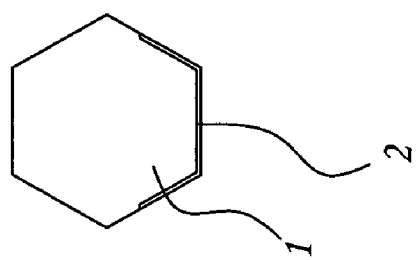
FIG. 5 is a cross sectional view of a hexagonal form of the light guide bar for the lighting fixture according to the present invention.
Figure 4:
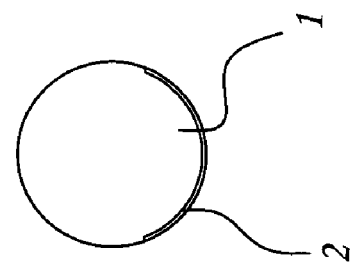
FIG. 4 is a cross sectional view of a circular form of the light guide bar for the lighting fixture according to the present invention.

The light guide bar 1 is a long bar made out of an optical material that allows light to pass and guides light, having a cross section of a predetermined shape, for example, circular shape in FIG. 4 or hexagonal shape in FIG. 5. The light guide bar 1 can be made having a rough outer surface 11 that shows a pattern of teeth (see FIG. 6), raised portions or cones (not shown). The rough outer surface 11 provides a function of refracting light in different directions.

Figure 6:
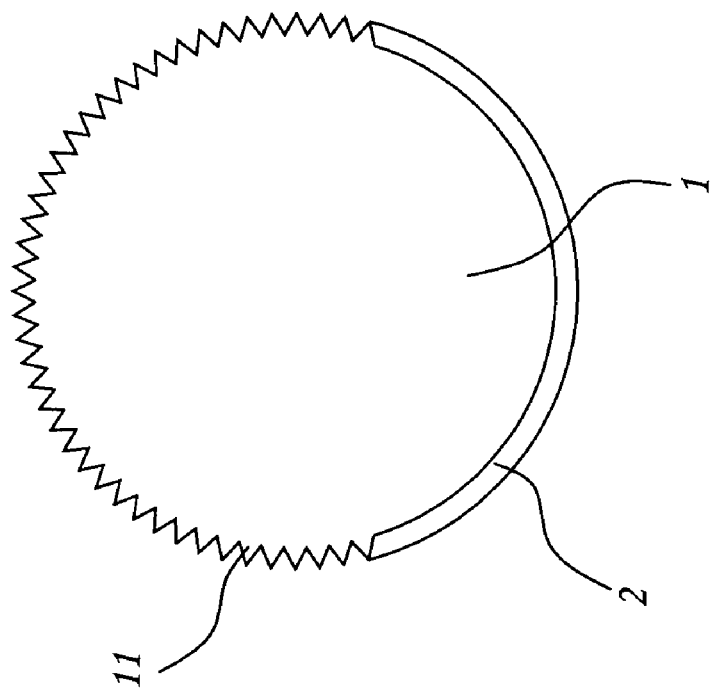
FIG. 6 is a cross sectional view showing the serrated pattern of the rough outer surface of the light guide bar for the lighting fixture according to the present invention.

The first reflector 2 is formed of a light reflecting film or sheet material, bonded to a part of the outer surface of the light guide bar 1 (see FIGS. 4~6).

The first reflector 2 can be formed integral with the outer surface of the light guide bar 1, i.e., the first reflector 22 is put in the cavity of the mold to be used to mold the desired light guide bar, and then the prepared optical material for molding the desired light guide bar is fed into the cavity of the mold and molded with the first reflector 2 into the desired light guide bar 1 carrying the first reflector 2. Alternatively, the first reflector 2 can be bonded to the outer surface of the light guide bar 1 with an adhesive.

Figure 2:
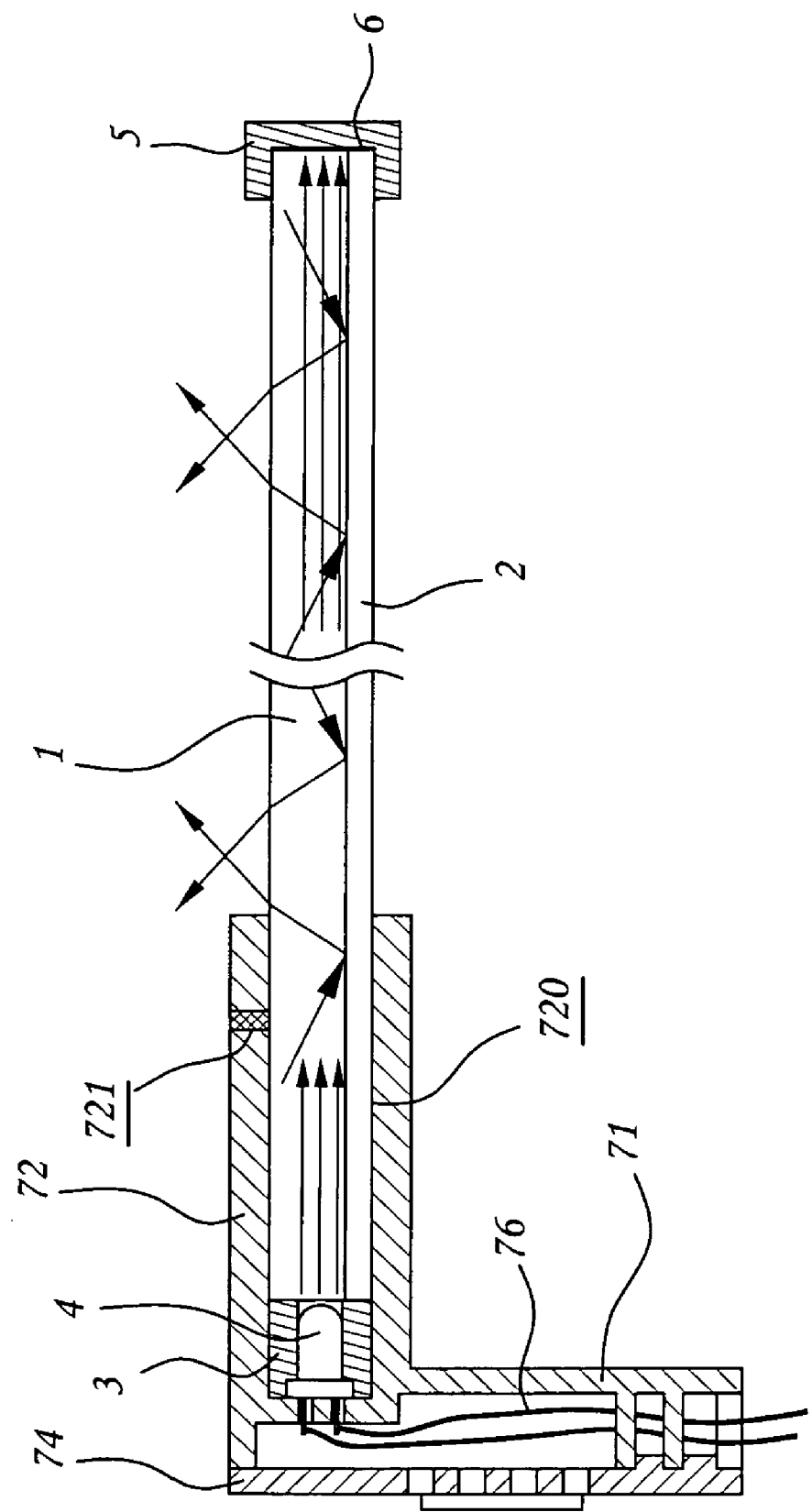
FIG. 2 is a schematic drawing showing an operation status of the lighting fixture according to the present invention.

The light emitting device 4 according to this embodiment is a light emitting diode for the advantages of long working life and low power consumption. The light emitting device 4 is provided at one end, namely, the first end of the light guide bar 1. The other end, namely, the second end of the light guide bar 1 is mounted with the second reflector 6 (see FIG. 2). In order to have the light of the light emitting device 4 be emitted into the light guide bar 1 along the center longitudinal axis of the light guide bar 1, the socket 3 is used and affixed to the first end of the light guide bar 1. The socket 3 has a through hole 31 through the two opposite ends thereof for accommodating the light emitting device 4. The socket 3 is preferably made out of an opaque or light absorptive material. After installation of the light emitting device 4 in the through hole 31 of the socket 3, the light emitting device 4 does not protrude over either end of the socket 3, such that the light emitted by the light emitting device 4 is guided by the through hole 31 of the socket 3 into the light guide bar 1 axially without dispersion.

Figure 7:
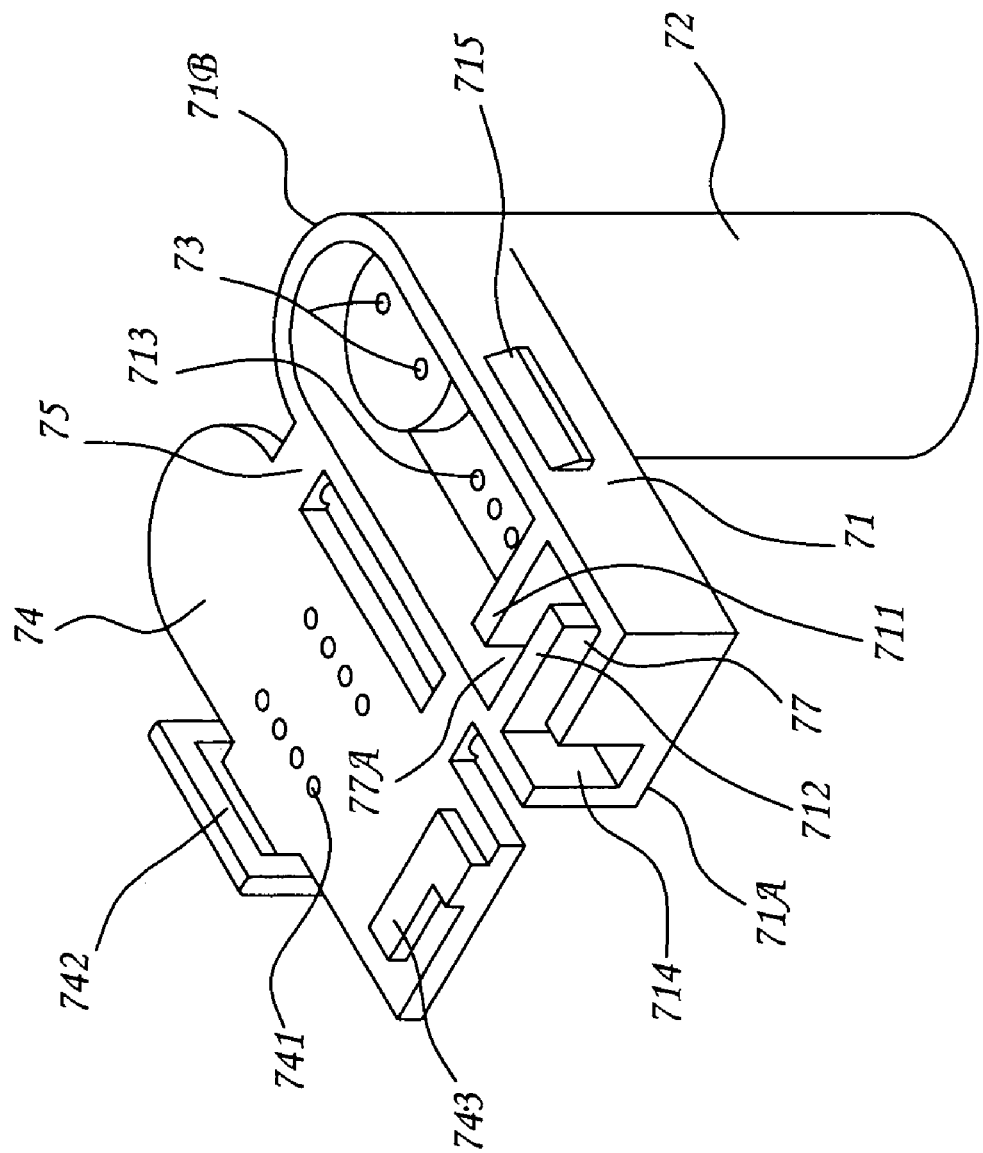
FIG. 7 is an elevational view of the connector for the lighting fixture according to the present invention.
Figure 8:
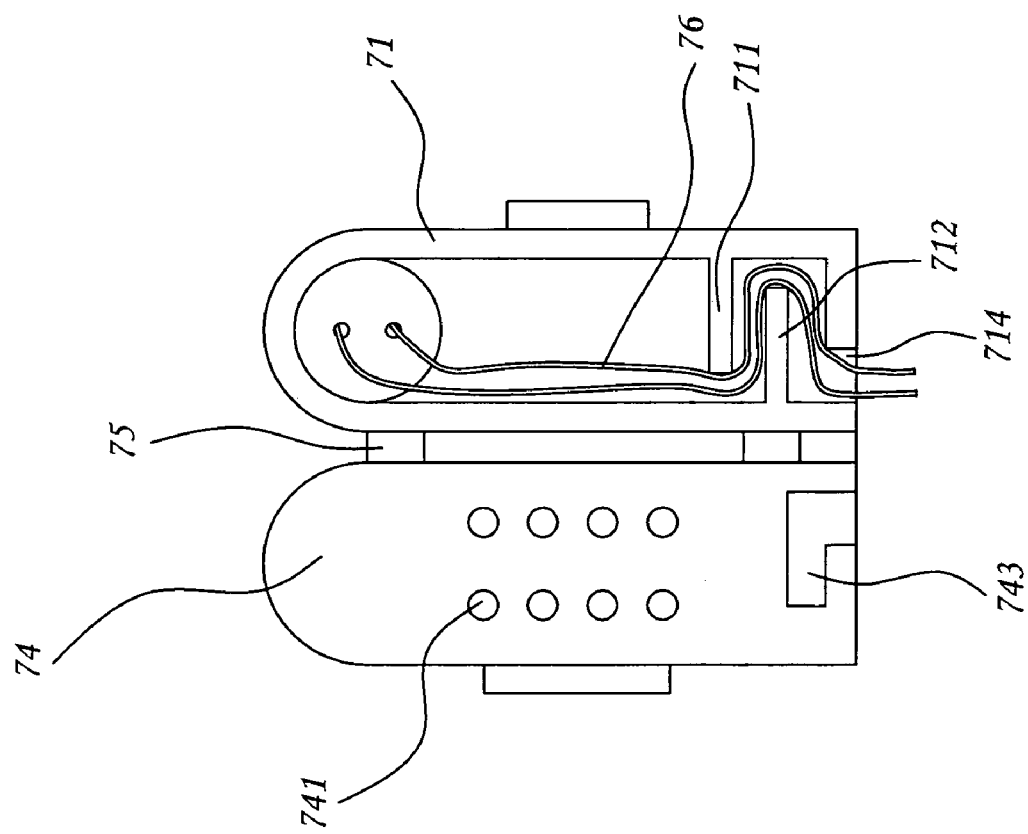
FIG. 8 is a schematic plain view of the connector for the lighting fixture according to the present invention, showing arrangement of electric wires in the accommodation space.

Referring to FIGS. 7 and 8 and FIG. 1 again, the connector 7 is preferably injection molded from plastics, comprising a body 71 and a cover 74. The body 71 has an accommodation space 710 surrounded by the side and bottom walls thereof. The body 71 has a first end 71A and a second end 71B. The first end 71A has a notch 714. A first partition board 711 and a second partition board 712 are arranged in parallel inside the accommodation space 710. The first partition board 711 and the second partition board 712 each have one end respectively connected to two opposite inner surfaces of the body 71 within the accommodation space 710, and the other end respectively spaced from the two opposite inner surfaces of the body 71 at a distance. The first partition board 711, the second partition board 712 and the first end 71A of the body 71 define two symmetrical L-shaped channels 77 and 77A. Air vents 713 are formed on the bottom wall of the accommodation space 710. The accommodation space 710 is adapted to accommodate the necessary electronic components (not shown).

A barrel 72 is perpendicularly extended from the bottom side of the second end 71B of the body 71. The barrel 72 has a longitudinal inside hole 720 extending to the free end thereof, at least one, for example, two wire holes 73 formed on the proximity end in communication with the accommodation space 710, and at least one transverse through hole 721 through the peripheral wall.

The cover 74 has one side connected to the body 71 with flexible connecting strips 75 so that the cover 74 is turnable relative to the body 71 between a close position and an open position. When the cover 74 is closed, it blocks the accommodation space 710. The cover 74 has a protruding block 743 protruded from an inner surface thereof for press-fitting into the L-shaped channel 77 between the second partition board 712 and the first end 71A of the body 71 to secure the cover 74 to the body 71 in the close position. The cover 74 further has a plurality of air vents 741. According to this embodiment, both the cover 74 and the body 71 have air vents for dissipation of heat. Alternatively, the connector can be made having air vents on the cover or body only.

Further, a hook 715 is provided at the outside wall of the body 71, and a complementary retaining eye member 742 is provided at one side of the cover 74. When the cover 74 is closed, the retaining eye member 742 is forced into engagement with the hook 715, thereby securing the cover 74 to the body 71 firmly in the close position.

Referring to FIGS. 2 and 8 again, the light guide bar 1 carrying the attached socket 3 and light emitting device 4 is inserted into the longitudinal inside hole 720 of the barrel 72 of the connector 7, and then a molten resin material is poured through the at least one transverse through hole 721 into the longitudinal inside hole 720 of the barrel 72. When the applied resin material is cooled down and hardened, the light guide bar 1 is affixed to the barrel 72 of the connector 7. The electric wires 76 that are respectively electrically connected to the light emitting device 4 are respectively inserted through the wire holes 73 into the accommodation space 710 of the body 71, and then respectively extended over the free ends of the partition boards 711 and 712 to the outside of the body 71 via the notch 714 for connection to power supply. Thereafter, the cover 74 is closed on the body 71 to force the retaining eye member 742 of the cover 74 into engagement with the hook 715 of the body 71, preventing opening of the cover 74 from the body 71 accidentally. Because the electric wires 76 are extended over the free ends of the partition boards 711 and 712 r to the outside of the body 71 via the notch 714 in a detoured manner, stretching the electric wires 76 from the outside of the body 71 accidentally does not cause disconnection of the electric wires 76 from the light emitting device 4. When electricity is connected to the light emitting device 4, the light emitting device 4 emits light into the light guide bar 1 in a direction along the center longitudinal axis of the light guide bar 1, and at the same time, the first reflector 2 and the second reflector 6 reflect light out of the light guide bar 1, showing a lighting effect.

Referring to FIGS. 1 and 2 again, the second reflector 6 is a thin film member closely attached to the second end of the light guide bar 1 for reflecting light backwards to the inside of the light guide bar 1. The cap 5 is capped on the second end of the light guide bar 1 to secure the second reflector 6 to the second end of the light guide bar 1 positively. The cap 5 is preferably made of an opaque or light absorptive material. The second reflector 6 is attached to the inside of the cap 5, and then the cap 5 is capped on the second end of the light guide bar 1 (or the second end of the light guide bar 1 is inserted into the cap 5 and stopped against the second reflector 6).

Referring to FIG. 2 again, when the lighting fixture of the present invention is in operation, light from the light emitting device 4 passes axially along the center longitudinal axis of the light guide bar 1 toward the second reflector 6 and is then reflected backwards to the inside of the light guide bar 1, and at the same time, a part of light passes directly out of the light guide bar 1 through the periphery beyond the first reflector 2 and a part of light is reflected by the first reflector 2 to the outside of the light guide bar 1, thereby providing a soft illumination.

Figure 3:
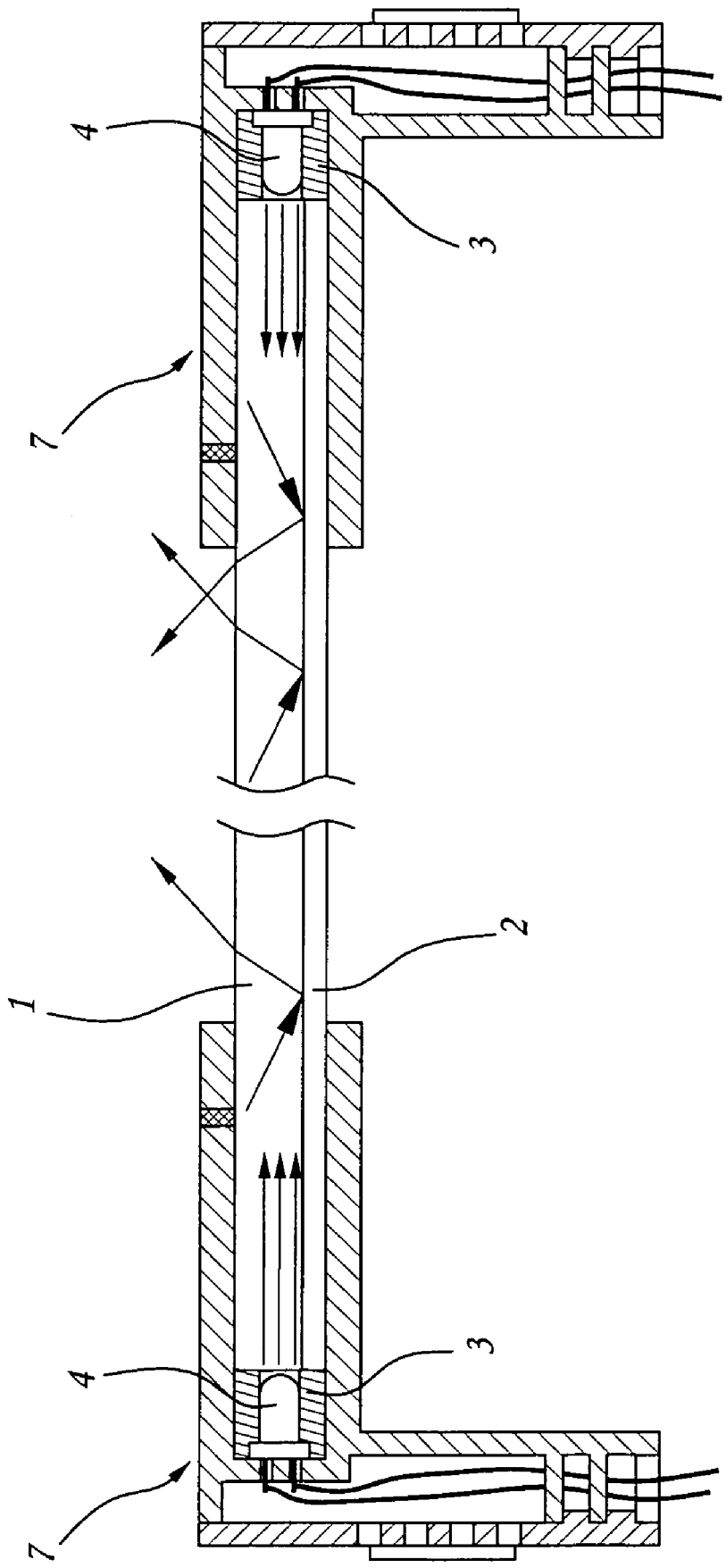
FIG. 3 is a schematic drawing showing an operation status of an alternate form of the lighting fixture according to the present invention.

FIG. 3 is a schematic drawing showing an alternate form of the lighting fixture according to the present invention. According to this embodiment, two caps 3 are respectively capped on the first and second ends of the light guide bar 1 to hold a respective light emitting device 4 on the inside, and two connectors 7 are respectively bonded to the first and second ends of the light guide bar 1. Light from the two light emitting devices 4 pass through the light guide bar 1 along the center longitudinal axis of the light guide bar 1, and the first reflector 2 reflects light out of the light guide bar 1 through the periphery of the light guide bar 1.

Referring to FIG. 6, the rough outer surface 11 of the light guide bar 1 shows a pattern of teeth, i.e., the light guide bar 1 has numerous projecting teeth arranged over the outer surface beyond the first reflector 2. The rough outer surface 11 enhances the intensity of light passing out of the light guide bar 1 and, softens the light.

Figure 9:
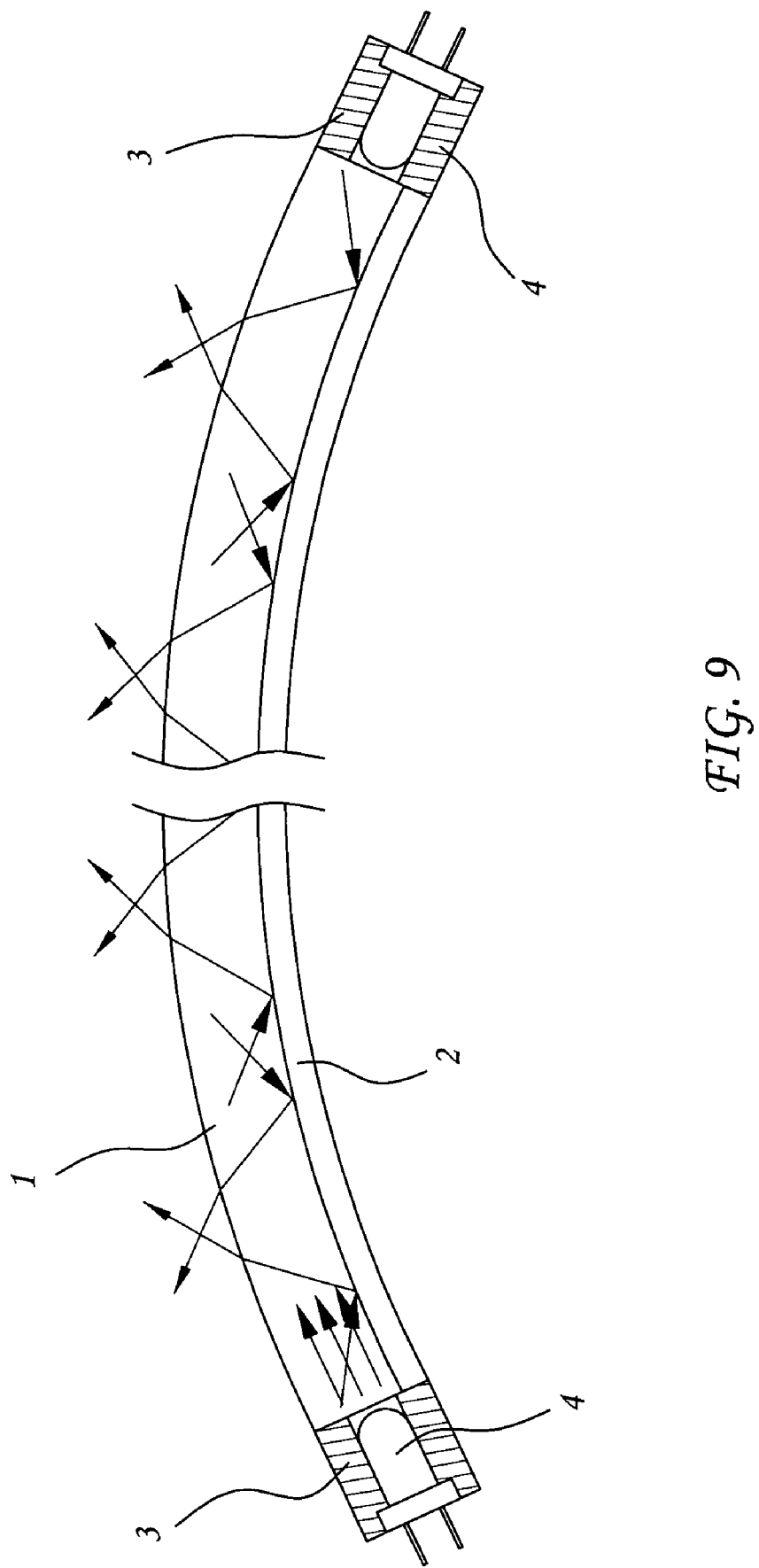
FIG. 9 is a schematic drawing of another embodiment of the present invention, showing the smoothly arched shape of the light guide bar.

The light guide bar 1 can be rectilinear. Alternatively, the light guide bar 1 can be smoothly arched, as shown in FIG. 9. According to the embodiment shown in FIG. 9, the smoothly arched light guide bar 1 has the first and second ends thereof respectively capped with a respective cap 3 that holds a respective light emitting device 4 on the inside.

A prototype of lighting fixture has been constructed with the features of FIGS. 1~9. The lighting fixture functions smoothly to provide all of the features discussed earlier.

Although particular embodiments of the inventions have been described in detail for purposes of illustration, various modifications and enhancements may be made without departing from the spirit and scope of the invention. Accordingly, the invention is not to be limited except as by the appended claims.

What the invention claimed is:

1. A lighting fixture comprising:
   a light guide bar made of a light transmissive and light guiding material; said light guide bar having an axially extending length, a first end, a second end, and a peripheral surface;
   first reflector means bonded to a part of the peripheral surface of said light guide bar;
   socket means made of an opaque material and affixed to the first end of said light guide bar, said socket means having a through hole through two distal ends thereof;
   a light emitting device mounted inside the through hole of said socket means; and
   a connector fastened to the first end of said light guide bar and holding said socket means and said light emitting device on the inside, said connector comprising:
   a body, said body having an accommodation space surrounded by side and bottom walls thereof, a first end, a second end, a notch on said first end, a first partition board and a second partition board arranged in parallel inside said accommodation space, said first partition board and said second partition board each having a fixed end respectively connected to two opposite inner surfaces of said body within said accommodation space and a free end respectively spaced from the two opposite inner surfaces of said body at a distance, said first partition board, said second partition board and said first end of said body defining two symmetrical L-shaped channels,
   a barrel perpendicularly extended from a bottom side of said second end of said body, said barrel having a longitudinal inside hole extending to a free end thereof that accommodates the first end of said light guide bar and said socket means, and at least one wire hole in communication with said accommodation space for the passing of electric wires from said light emitting device to the outside of said body via said notch,
   a cover for closing the accommodation space of said body, and
   flexible connecting strips connected between one side of said body and one side of said cover.

2. The lighting fixture as claimed in claim 1, further comprising second reflector means covered on the second end of said light guide bar, and cap means capped on the second end of said light guide bar to hold said second reflector means in an inside space thereof and to keep said second reflector means covered on the second end of said light guide bar.

3. The lighting fixture as claimed in claim 1, wherein said light emitting device is a light emitting diode.

4. The lighting fixture as claimed in claim 1, wherein the peripheral surface of said light guide bar is a rough surface.

5. The lighting fixture as claimed in claim 1, wherein the barrel of said connector has a transverse through hole.

6. The lighting fixture as claimed in claim 1, further comprising a second socket affixed to the second end of said light guide bar, a second light emitting device mounted inside said second socket and aimed at the second end of said light guide bar, and a second connector fastened to the second end of said light guide bar to hold said second socket and said second light emitting device on the inside.

7. The lighting fixture as claimed in claim 1, wherein said light guide bar is rectilinear.

8. The lighting fixture as claimed in claim 1, wherein said light guide bar is arched.

* * * * *